United States Patent [19]

Woodroff et al.

[11] 4,137,041

[45] Jan. 30, 1979

[54] HEATERS

[75] Inventors: Victor C. Woodroff, Epping; John S. Walford, Shenfield, both of England

[73] Assignee: Jetaire Company Limited, London, England

[21] Appl. No.: 794,103

[22] Filed: May 5, 1977

[30] Foreign Application Priority Data

May 6, 1976 [GB] United Kingdom ............... 18686/76

[51] Int. Cl.² .............................................. F23D 11/02
[52] U.S. Cl. .................................. 432/222; 126/59.5; 126/110 C; 431/352
[58] Field of Search .................... 432/222; 126/110 C, 126/59.5; 431/10, 351, 352

[56] References Cited

U.S. PATENT DOCUMENTS

| 2,730,349 | 1/1956 | Kilbury | 432/222 |
| 2,853,284 | 9/1958 | Freeman | 432/222 |
| 3,055,145 | 9/1962 | Lindsay | 432/222 x |
| 3,301,308 | 1/1967 | Briggs | 432/222 X |
| 3,881,863 | 5/1975 | Cruez | 432/222 |
| 3,883,290 | 5/1975 | Windelbandt | 432/222 X |

*Primary Examiner*—Edward G. Favors
*Attorney, Agent, or Firm*—Oblon, Fisher, Spivak, McClelland & Maier

[57] ABSTRACT

A heater of particular use in drying grain has a fluid fuel burner located axially in a housing through which air is drawn and a coaxial convergent guide ring downstream of the burner. One or more openings in the housing admit ambient air for mixing with the heated air downstream of the guide ring. The heater permits of supply of air at, for example, 5000 to 35000 ft³/min at a temperature of 10° F above ambient.

11 Claims, 4 Drawing Figures

HEATERS

The present invention relates to heaters and provides a heater which is capable of providing a relatively large volume of warm air for use in, for example, grain or other produce drying installations.

A known type of heater has a fluid fuel, usually gas, burner axially located in a housing through which air is blown by a fan mounted upstream of the burner. The air is heated by the burner and subsequently discharged for space or other heating purposes downstream of the burner. A particularly efficient heater of this type is that described in U.K. Patent Specification No. 866273 in which the burner is a gas burner having a plurality of peripherally spaced outlets through which gas is discharged radially of the housing axis to form, when ignited, an annular sheet of flame.

Heaters of said known type are efficient in heating volumes of air up to, for example, 1500 ft$^3$/min. and are widely used for space heating purposes. However, they are not capable of providing the relatively large volumes of warm air of, for example, 5,000 to 35,000 ft$^3$/min. desirable for drying grain and other produce. In particular such large volumes make it difficult, if not impossible, to maintain the flame at the burner. It is an object of the present invention to provide a heater of a design which can efficiently and reliably warm said large volumes of air.

According to the present invention, there is provided a heater comprising a housing through which air can be sucked; a fluid fuel burner located axially in the housing to heat air passing through the housing; a coaxial convergent guide ring extending inwardly from the wall of the housing downstream of the burner; and one or more openings in the housing downstream of the mouth of the guide ring to admit ambient air for mixing with the heated air downstream of the guide ring.

Air can be sucked through the heater by means of a separate fan assembly to the inlet end of which the housing can be attached. Alternatively, the heater can include a fan mounted within the housing downstream of the guide ring and ambient air opening(s).

Usually the housing will be of circular cross-section and it is preferred that it is divergent in the region containing the guide ring and ambient air opening(s).

It is also preferred that the burner is a gas burner, especially of the kind having a plurality of peripherally spaced outlets through which gas is discharged radially of the housing axis to form, when ignited, an annular sheet of flame. In a particularly preferred embodiment, the gas burner comprises a gas duct coaxial with the housing and open at its upstream end to receive air for combustion and closed at its downstream end except for the peripherally spaced outlets which are disposed as several axially spaced rings. In order to ensure proper control of the burner flame, the burner advantageously includes control means for regulating the ingress of air for combustion. Conveniently, said means can comprise a pair of relatively movable apertured plates extending over the combustion air inlet.

The guide ring extends coaxially and inwardly from the wall of the housing and converges in the downstream direction to cause the heated airstream from the burner to converge. Advantageously, said ring is of frustoconical shape.

The ambient air opening(s) preferably extend peripherally of the housing and are in the portion of the housing surrounding the guide ring. In order to prevent extraneous matter entering the housing, the openings usually will be covered by a wire mesh or other foramenous cover.

When a gas burner of the aforementioned type providing an annular sheet of flame is employed, it is preferred to provide a back pressure plate downstream of the burner and especially a plate of the same diameter as the burner axially aligned therewith.

In order to inhibit overheating of the heater, means responsive to the flow of air over the burner can be provided to automatically terminate the fuel supply to the burner when said flow falls below a predetermined threshold level.

As mentioned previously, the invention has particular application to the drying of produce, especially grain. It will be appreciated however that the heater can also be used for substantially any application where a relatively large volume of warm air is required.

The following is a description by way of example only and with reference to the accompanying drawings of a heater in accordance with a preferred embodiment of the invention. In the drawings.

Figure 1:
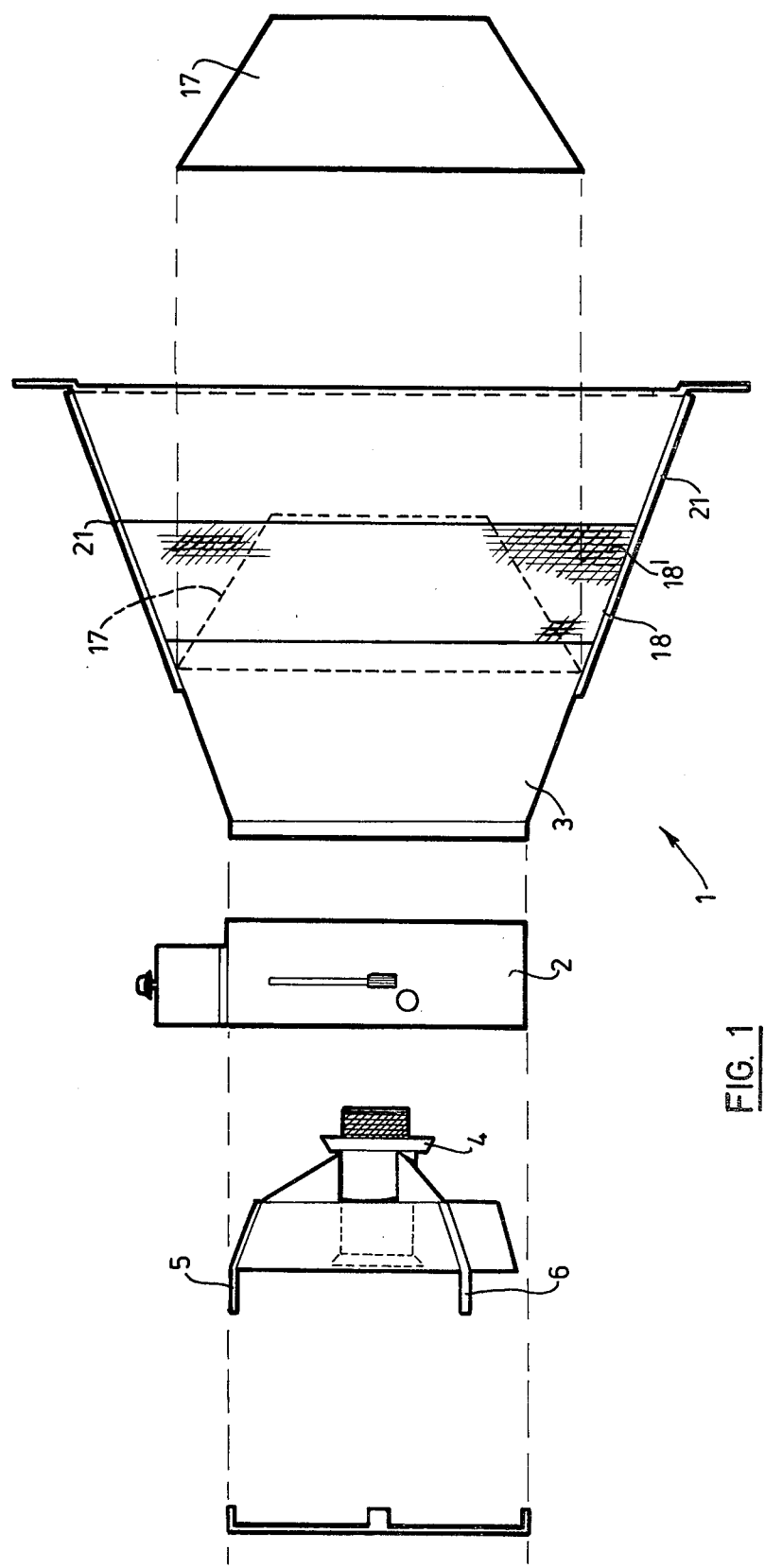
FIG. 1 is an exploded side elevation of the heater.
Figure 2:
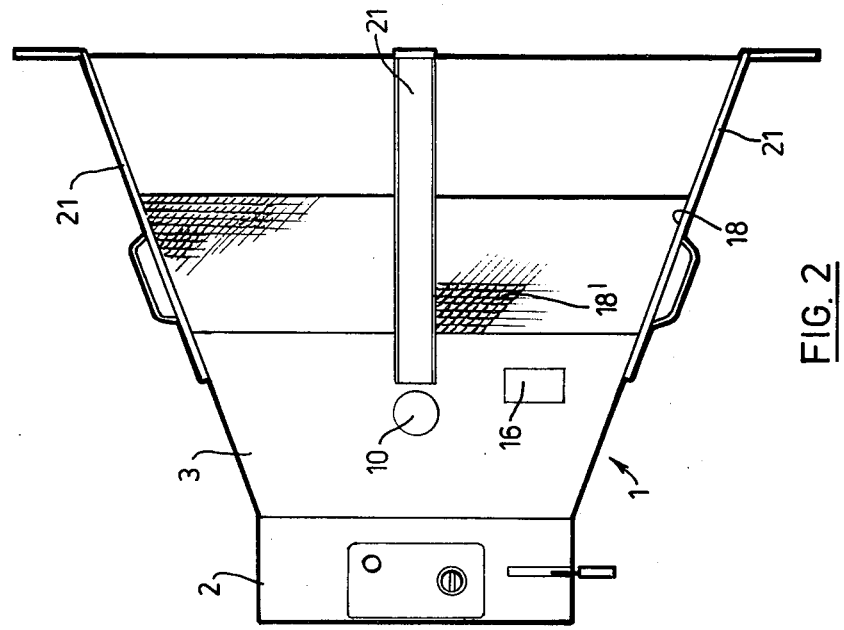
FIG. 2 is a top plan view of the heater of FIG. 1 in its assembled condition.
Figure 3:
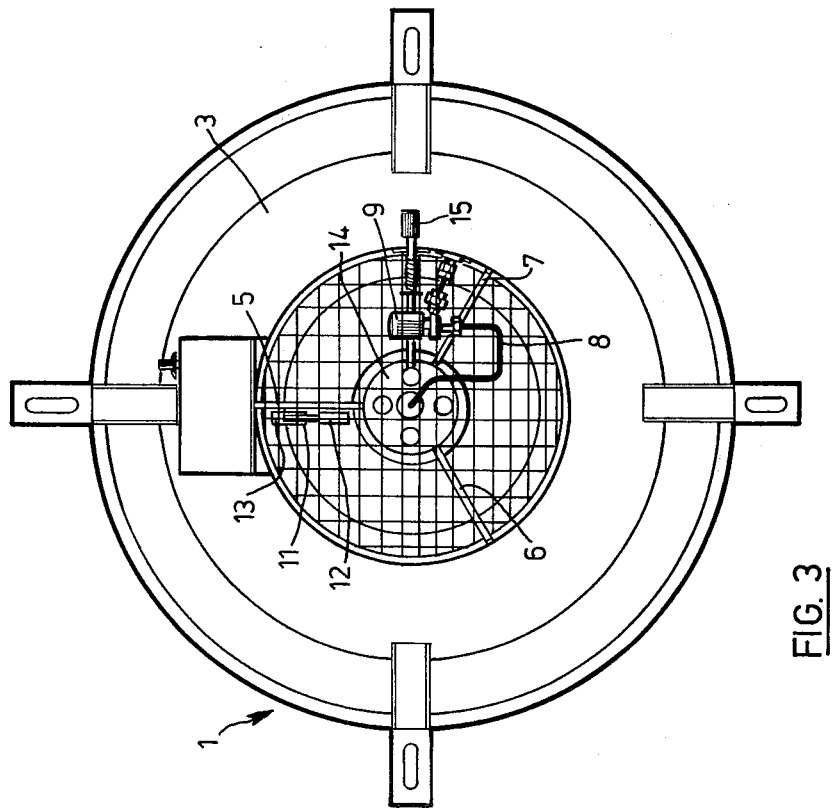
FIG. 3 is an inlet end view of the heater of FIG. 2.
Figure 4:
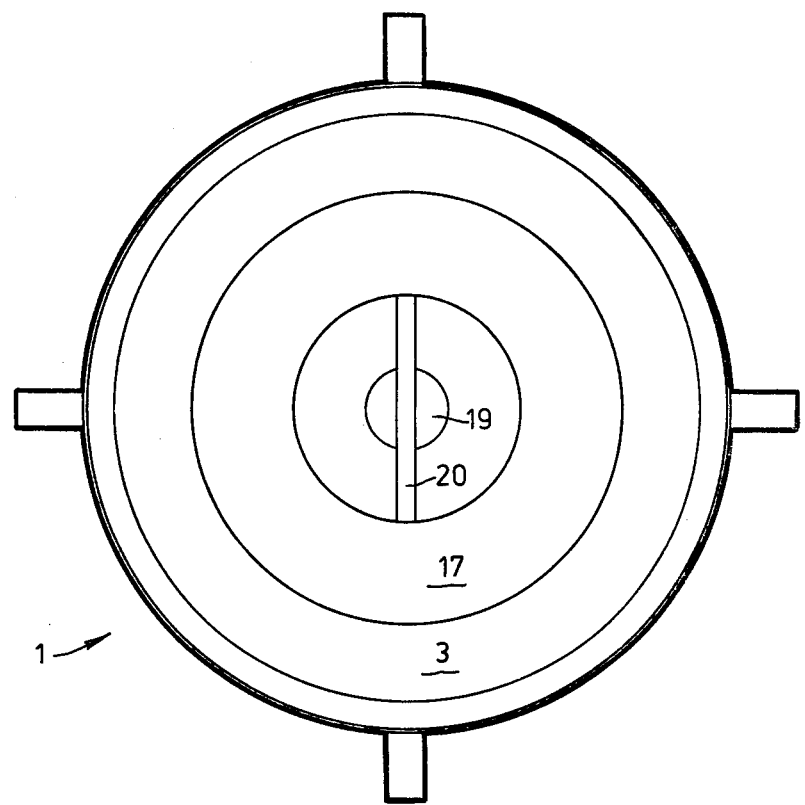
FIG. 4 is an outlet end view of the heater of FIG. 2.

Referring to the drawings, a heater generally indicated at 1 comprises a housing formed of a short cylindrical inlet portion 2 and a longer divergent frustoconical portion 3. A gas burner 4 is supported in annular portion 2 by three spider legs 5,6 and 7. The burner 4 is of substantially the construction described in U.K. Patent Specification No. 866273 with reference to the drawing of Provisional Specification No. 19272/58, and is supplied with propane gas through a line 8 provided with a solenoid-operated cut-off valve 9 and a pressure regulator (not shown).

Valve 9 is spring biassed to its closed position and is movable to an open position by an electric current passing through its solenoid via a circuit including in series a temperature sensor 10 and an air-flow sensor 11. If the air temperature in the conical portion exceeds a predetermined threshold value the electric circuit is broken and the valve 9 closes under its spring bias. The air-flow sensor 11 comprises a deflectable thin plate 12 attached to a microswitch 13. If the flow of air through the annular gap between the housing portion 2 and the burner 4 falls below a predetermined threshold value the plate is insufficiently deflected to maintain the microswitch in its closed position and the electric circuit is thereby broken allowing valve 9 to close under its spring bias.

The air inlet to the burner 4 is covered by a pair of apertured plates 14 of which one is fixed and the other movable relative thereto by means of a rotatable control arm 15 to vary the extent of alignment of the apertures in the respective plates. In this manner fuel/air ratios of the burner can be maintained by compensating for changes in the rate at which air is sucked into the housing portion 2. A window 16 is provided in the housing to permit of observation of the colour and shape of the flame.

A frustoconical guide ring 17 is secured to the wall of housing portion 3 and converges in the downstream direction as indicated by the dotted lines in FIG. 1. An annular opening 18 extends through housing portion 3 immediately downstream of the mouth of the guide ring 17. The opening is covered by a wire mesh grill 18'.

A back pressure disc 19 of the same diameter as the burner 4 is supported coaxially in the outlet of guide ring 17 by a cross-member 20.

Four ribs 21 are provided on the outer surface of housing portion 3 and terminate at the housing outlet in respective radially extending brackets which facilitate connection of the heater to the inlet side of an agricultural fan manufactured by Simplex of Cambridge.

In use, the heater is connected to the fan and air drawn in through the mouth of housing portion 2. A proportion of the air passes through apertured plates 14 into the burner 4 whilst the remainder passes about the burner to be heated by the flame thereof. The heated air subsequently passes through guide ring 17 where the airstream is converged with a resultant increase in velocity. Disc 19 causes a back pressure effect which assists satisfactory operation of the burner. Ambient air is drawn in through opening 18 and mixes with the heated air downstream of the guide ring and primarily in the fan casing.

A typical heater of the kind shown in the drawings has an axial length of 30 inches and the housing portion 3 expands from 17 inches diameter to 34 inches diameter. The air flow through the heater outlet can vary in such a heater from 5,000 to 35,000 ft$^3$/min. The heat output of the burner 4 can be varied from 64,000 to 250,000 B.T.U./hr and usually is controlled to provide output air at a temperature of 10° F. above ambient temperature. Said heater and fan assembly was effective in the drying of grain.

It will be appreciated that the invention is not restricted to the details described above but that numerous modifications and variations can be made without departing from the scope of the invention as defined in the following claims.

What is claimed is:

1. A heater comprising:
   a housing through which air can be sucked;
   a fluid fuel burner located axially in the housing and spaced from the walls of the housing thereby to heat part only of the air passing through the housing;
   a coaxial convergent guide ring the wall of which is imperforate and extends inwardly from the wall of the housing downstream of the burner; and
   one or more openings in the housing downstream of the mouth of the guide ring to admit ambient air for mixing with the heated air downstream of the guide ring, the wall of the housing upstream of the mouth of the guide ring being imperforate and shaped to provide the housing with a divergent portion upstream of the convergent guide ring.

2. The heater according to claim 1 wherein the housing is of circular cross-section.

3. The heater according to claim 2 wherein the housing is divergent in the region containing the guide ring and the ambient air opening(s).

4. The heater according to claim 1 wherein the burner is a gas burner having a plurality of peripherally spaced outlets through which gas is discharged radially of the housing axis to form, when ignited, an annular sheet of flame.

5. The heater according to claim 4 wherein the gas burner comprises a gas duct coaxial with the housing and open at its upstream end to receive air for combustion and closed at its downstream end except for the peripherally spaced outlets which are disposed as several axially spaced rings.

6. The heater according to claim 4 wherein control means are provided for regulating the ingress of combustion air to the burner, said control means comprising a pair of relatively removable apertured plates extending over the combustion air inlet.

7. The heater according to claim 1 wherein the guide ring is of frustoconical shape.

8. The heater according to claim 1 wherein the ambient air opening(s) extend peripherally of the housing.

9. The heater according to claim 1 wherein the ambient air opening(s) are in the portion of the housing surrounding the guide ring.

10. The heater according to claim 4 wherein a back pressure plate is provided downstream of the burner.

11. The heater according to claim 10 wherein said plate is of the same diameter as the burner and is axially aligned therewith.

* * * * *